US008720602B2

(12) United States Patent
Saf

(10) Patent No.: US 8,720,602 B2
(45) Date of Patent: May 13, 2014

(54) PULSE GENERATING DEVICE AND A ROCK DRILLING RIG COMPRISING SUCH A DEVICE

(75) Inventor: Fredrik Saf, Vintrosa (SE)

(73) Assignee: Atlas Copco Rock Drills AB, Orebro (SE)

( * ) Notice: Subject to any disclaimer, the term of this patent is extended or adjusted under 35 U.S.C. 154(b) by 473 days.

(21) Appl. No.: 12/734,815

(22) PCT Filed: Dec. 17, 2008

(86) PCT No.: PCT/SE2008/000717
§ 371 (c)(1), (2), (4) Date: May 24, 2010

(87) PCT Pub. No.: WO2009/082322
PCT Pub. Date: Jul. 2, 2009

(65) Prior Publication Data

US 2011/0000695 A1 Jan. 6, 2011

(30) Foreign Application Priority Data

Dec. 21, 2007 (SE) ...................................... 0702862

(51) Int. Cl.

| | |
|---|---|
| ***B23B 45/16*** | (2006.01) |
| ***B25D 9/00*** | (2006.01) |
| ***B25D 11/00*** | (2006.01) |
| ***B25D 13/00*** | (2006.01) |
| ***B25D 16/00*** | (2006.01) |

(52) U.S. Cl.
USPC .......................................................... 173/201

(58) Field of Classification Search
USPC ...................... 173/14, 17, 200–201, 142, 110
See application file for complete search history.

(56) References Cited

U.S. PATENT DOCUMENTS

| | | | | |
|---|---|---|---|---|
| 3,525,404 | A | 8/1970 | Newman et al. | |
| 3,612,191 | A | 10/1971 | Martini | |
| 3,741,316 | A * | 6/1973 | Alajouanine | 173/107 |
| 3,768,576 | A * | 10/1973 | Martini | 173/73 |
| 3,860,026 | A * | 1/1975 | Van Der Koogh | 137/202 |
| 6,119,796 | A * | 9/2000 | Schmid | 173/201 |

(Continued)

FOREIGN PATENT DOCUMENTS

| | | |
|---|---|---|
| CH | 559 088 | 2/1975 |
| DE | 2206014 | 8/1973 |

(Continued)

*Primary Examiner* — Robert Long
(74) *Attorney, Agent, or Firm* — Mark P. Stone

(57) ABSTRACT

The present invention relates to a pulse generating device for inducing a shock wave in a tool, wherein the said pulse generating device comprises an impact means (201; 301) for transferring energy to a drill string (202) connected to the said tool, and wherein the energy transfer gives rise to the said shock wave, in which the said energy is mainly constituted by elastic energy stored in the impact means (201; 301) and/or an energy store. The device comprises control means for controlling the interaction of the impact means (201; 301) with the drill string (202), wherein the said control means for controlling the interaction of the impact means (201; 301) with the drill string (202) comprises a motor (207; 307), and wherein the said motor (207; 307) is designed to, through rotation, alternately open ducts for pressurization and depressurization of at least one drive surface (205) acting upon the said impact means. The invention is characterized in that the rotation axis of the said motor (207; 307) is arranged substantially coaxially with the drill string (202).

20 Claims, 5 Drawing Sheets

(56) References Cited

U.S. PATENT DOCUMENTS

| | | | | |
|---|---|---|---|---|
| 6,938,704 | B2 * | 9/2005 | Berger et al. | 173/201 |
| 7,082,078 | B2 * | 7/2006 | Fripp et al. | 367/83 |
| 7,096,973 | B2 * | 8/2006 | Ikuta et al. | 173/201 |
| 7,252,157 | B2 * | 8/2007 | Aoki | 173/162.2 |
| 7,258,167 | B2 * | 8/2007 | Shammai et al. | 166/264 |
| 7,290,622 | B2 * | 11/2007 | Keskiniva et al. | 173/91 |
| 7,600,420 | B2 * | 10/2009 | Meek | 73/152.54 |
| 7,861,641 | B2 * | 1/2011 | Weddfelt | 91/321 |
| 7,861,799 | B2 * | 1/2011 | Iwakami et al. | 173/201 |
| 7,878,263 | B2 * | 2/2011 | Keskiniva et al. | 173/90 |
| 7,886,843 | B2 * | 2/2011 | Weddfelt | 175/24 |
| 8,051,926 | B2 * | 11/2011 | Weddfelt | 175/293 |
| 8,056,648 | B2 * | 11/2011 | Weddfelt | 175/40 |
| 8,091,652 | B2 * | 1/2012 | Sinnerstad et al. | 175/24 |
| 8,151,899 | B2 * | 4/2012 | Tuomas | 173/1 |
| 8,215,529 | B2 * | 7/2012 | Wu | 227/130 |
| 2008/0314608 | A1 * | 12/2008 | Berger et al. | 173/132 |
| 2009/0236387 | A1 * | 9/2009 | Simonelli et al. | 227/8 |
| 2010/0025061 | A1 * | 2/2010 | Meixner et al. | 173/118 |
| 2010/0025106 | A1 * | 2/2010 | Weddfelt | 175/24 |
| 2010/0258326 | A1 * | 10/2010 | Weddfelt | 173/212 |
| 2010/0300718 | A1 * | 12/2010 | Hartmann et al. | 173/201 |

FOREIGN PATENT DOCUMENTS

| | | | | |
|---|---|---|---|---|
| FR | 2165598 | | 8/1973 | |
| GB | 2 047 794 | A | 12/1980 | |
| WO | WO 0140613 | A2 | 6/2001 | |
| WO | WO 2004073933 | A1 * | 9/2004 | B25D 9/22 |

* cited by examiner

PULSE GENERATING DEVICE AND A ROCK DRILLING RIG COMPRISING SUCH A DEVICE

FIELD OF THE INVENTION

The present invention relates to a pulse generating device for use in drilling into material such as, for example, rock. More specifically, the present invention relates to a pulse generating device according to claim 1. The invention also relates to a rock drilling rig according to claim 16.

BACKGROUND TO THE INVENTION

In rock drilling, a drilling tool which is connected to a rock drilling device by one or more drill string components is often used. The drilling can be carried out in a number of different ways, in which a commonly occurring method is percussion drilling, in which a pulse generating device, a percussion device, is used to generate percussions with the aid of a reciprocating piston. The percussion piston strikes the drill string, usually via a drill shank, so as, by transfer of kinetic energy to the drill string, to produce shock waves, which are propagated through the drill string to the drilling tool and then onward from the tool to the rock for release of energy of the shock wave.

The percussion piston is typically driven by pressurization and depressurization of drive surfaces acting upon the percussion piston in the longitudinal direction of the drill string, the said pressurization usually being realized with the aid of hydraulically and/or pneumatically working means.

Pulse generating devices of this kind, in which the shock wave is generated by transfer of the kinetic energy of the percussion piston to the drill shank/the drill string, can give rise however, at least under certain operating conditions, to undesirable side effects, such as that the kinetic energy generated with the reciprocating motion of the percussion piston can produce an undesirable negative effect upon the pulse generating device and/or drill string and/or tool.

There is also another type of pulse generating devices, in which the shock wave energy, instead of being generated, as above, by means of released kinetic energy from a reciprocating piston, is instead generated by the release of stored elastic energy, which is transferred to the drill string from an impact means and/or an energy store via the impact means, which in this case only performs a very small movement, i.e. the kinetic energy which is transferred is substantially lower than the transferred elastic energy.

According to the prior art, such solutions generate shock waves with lower energy compared with a conventional percussion piston in which, in order to maintain the effectiveness of the drilling, the lower shock wave energy is compensated for by higher-frequency generation of the shock waves.

One problem with such pulse generating devices is, however, that the substantially higher shock wave frequency which is required to obtain the desired drilling effect places demands, in turn, upon the mechanism that opens and closes ducts to the drive surfaces which act upon the impact means in the generation of the said shock waves.

In WO2004/073933, an example is shown of a pulse generating device of this kind, in which a rotary control valve is used to achieve rapid opening and closure of ducts to a drive surface acting upon the impact means. The shown solution has the drawback, however, that a drive motor is required to drive the control valve, and this drive motor entails that the pulse generating device acquires a larger diameter due to the diameter of the drive motor. This is aggravated, moreover, by the fact that, especially where a high rotation frequency is desired, the drive motor must have a certain diameter to prevent the rotation speed difference between the valve and the motor from becoming too large, since a large difference can result in the desired drive motor speed (valve speed) not being reached for design reasons.

In tunnelling, for example, the desired drilling machine diameter is a major drawback, since a large drilling machine diameter entails an unnecessarily large quantity of material having to be removed from the mine to allow a constant diameter to be maintained through the tunnel. The larger quantity of removed material also means that a greater volume has to be refilled with concrete, for example, following drilling.

There is therefore a need for an improved drive mechanism for drilling machines intended for high-frequency operation.

MOST IMPORTANT CHARACTERISTICS OF THE OBJECTS OF THE INVENTION

One object of the present invention is to provide a pulse generating device which solves, or at least alleviates, the above problems. This object is achieved according to the present invention by a device as defined in claim 1.

According to the present invention, a pulse generating device for inducing a shock wave in a tool is provided, wherein the said pulse generating device comprises an impact means for transferring energy to a drill string connected to the said tool, and wherein the energy transfer gives rise to the said shock wave, in which the said energy is mainly constituted by elastic energy stored in the impact means and/or an energy store. The device comprises control means for controlling the interaction of the impact means with the drill string, the said control means for controlling the interaction of the impact means with the drill string comprising a motor, and the said motor being designed to, through rotation, alternately open ducts for pressurization and depressurization of at least one drive surface acting upon the said impact means. The invention is characterized in that the rotation axis of the said motor is arranged substantially coaxially with the drill string.

This has the advantage that, with the rotation axis of the motor arranged substantially coaxially with the drill string, this motor can be used to drive a valve which is axially offset relative to the motor, which in turn implies that the outer diameter of the pulse generating device can be kept substantially smaller compared with a solution according to the prior art. This also has the advantage that the rotation speed of the motor can be fully utilized, which is very advantageous in the driving of pulse generating devices in which energy is transferred in the form of elastic energy and thus substantially higher shock wave frequency is required.

The present invention is especially advantageous in respect of pulse generating devices in which the device comprises a pressure chamber acting in the direction away from the tool towards the impact means, the said motor being designed to, by means of rotation, alternately open and close ducts for pressurization and depressurization of the said pressure chamber. This since, in such a solution, both valve and motor should, or perhaps even must, be arranged “downstream”, i.e. in the direction of the tool, viewed from the drive surface of the impact means, in which case, according to the present invention, a motor up to a relatively large diameter can be used without needing to deviate from the boundaries for other design-related limitations of the drilling machine, and, moreover, without gear reduction with a view to minimizing the outer diameter of the drilling machine. The present invention therefore implies that drilling can be carried out at high frequency with several types of drilling machines, without any significant increase in the generation of surplus rock.

The invention also relates to a rock drilling rig.

DETAILED DESCRIPTION OF EXEMPLARY EMBODIMENTS

Figure 1B:
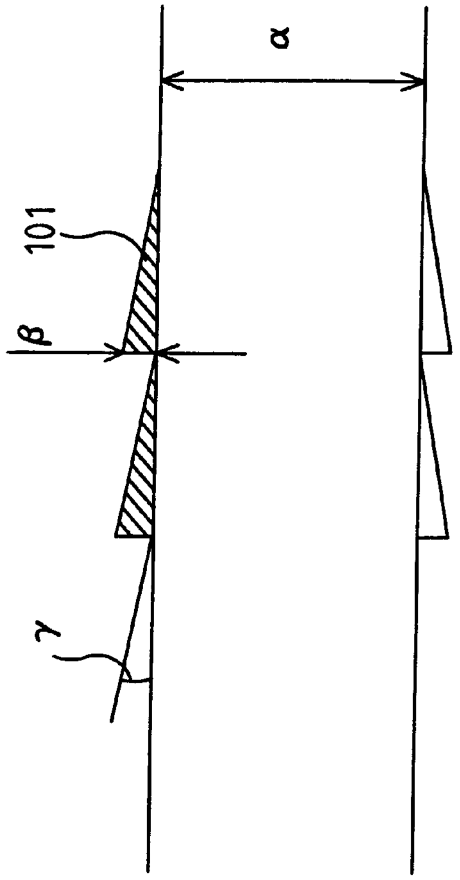
FIGS. 1A-B show schematically the effect of the drilling machine diameter on the quantity of drilled material in, for example, tunnelling.
Figure 1A:
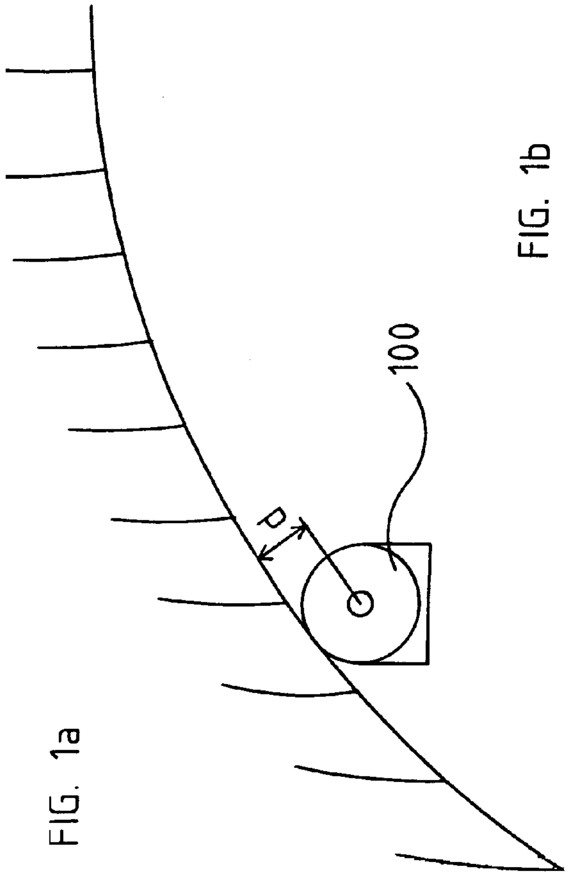

As has been stated above, the diameter of the drilling machine constitutes an important parameter in, for example, tunnelling. This is illustrated in FIGS. 1A and 1B, in which in FIG. 1A a drilling machine 100 is shown schematically in rear view. In tunnelling, the distance d is very important, since this distance controls the direction into the rock with which drilling must be carried out to allow a tunnel of regular diameter to be obtained.

This is exemplified in FIG. 1B, in which the desired diameter of the tunnel is indicated with α, and in which the actual drilling is represented as a saw tooth pattern 101, in which the distance β is essentially governed by the diameter of the drilling machine. The smaller the drilling machine diameter, the smaller is the angular deviation γ relative to the desired tunnel periphery that can be used in the drilling, which results in a reduced distance β and thus also in a smaller surplus material component (indicated with dashed lines) which has to be removed for subsequent refilling, for example in concrete lining operations.

Figure 2A:
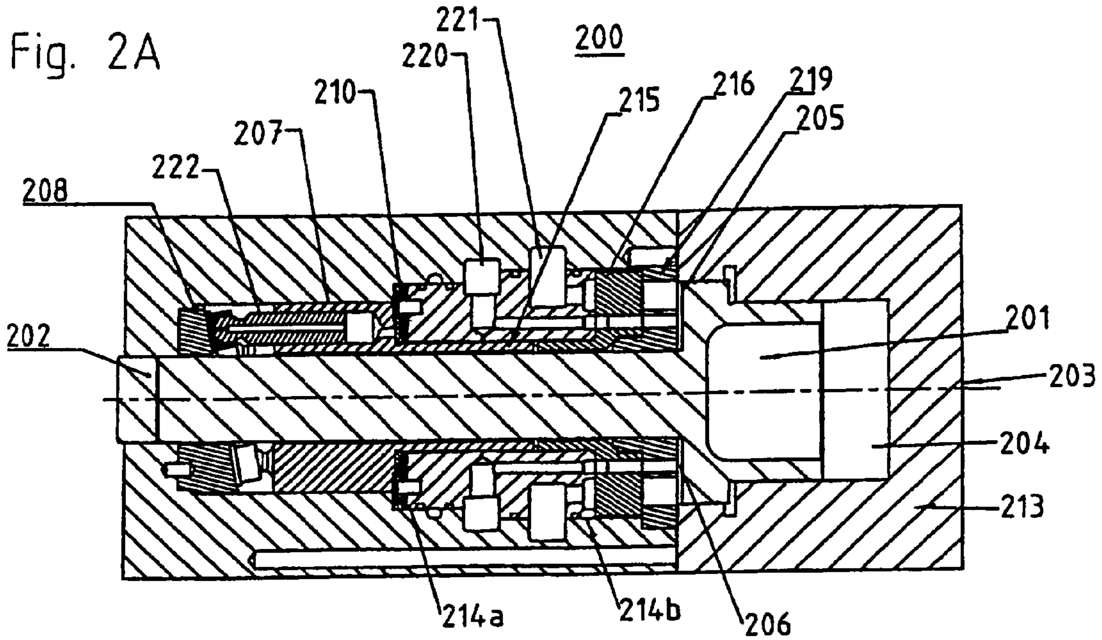
FIGS. 2A-B show a first embodiment of a pulse generating device according to the present invention.
Figure 2B:
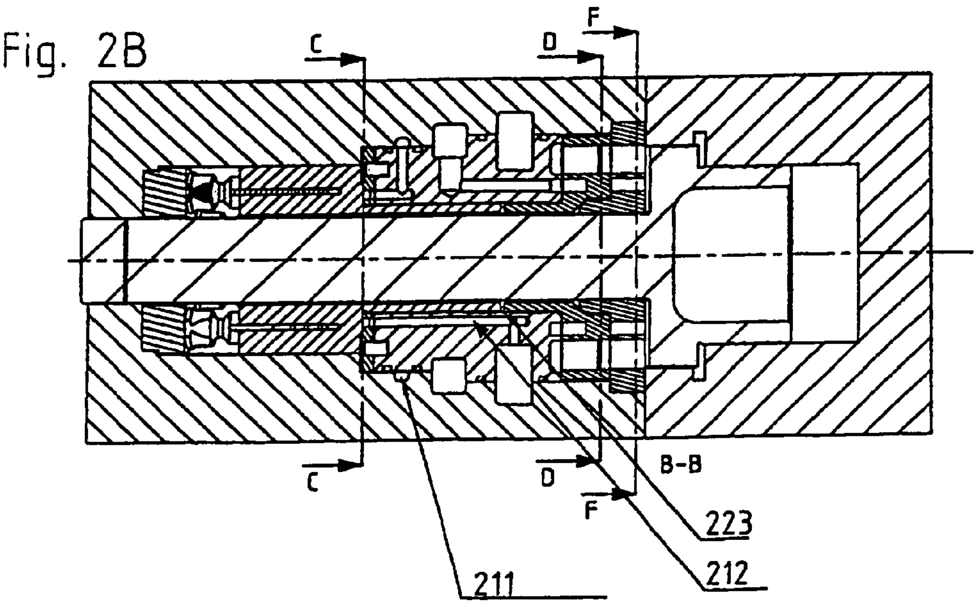

FIGS. 2A-B show a pulse generating device 200, which advantageously can be used with a drilling device, such as a rock drilling rig, and which allows a smaller drilling machine diameter in machines, for example, of the type shown in WO2004/073933. During operation, the pulse generating device 200 is connected to a drilling tool (not shown), such as a drill bit, by a drill string consisting of one or more drill string components, indicated as 202 in the figure. During drilling, energy in the form of shock waves is transferred to the drill string 202 via an impact means 201. In the shown device 200, it is not a reciprocating piston that is used to generate the shock waves, but instead a tensionable impact means in the form of a pulse piston 201.

Devices in which the shock wave energy is transferred in the form of elastic energy instead of mainly kinetic energy from a conventional percussion piston are available according to a number of different working principles, in which the principle shown in FIGS. 2A-B works in such a way that the pulse piston 201 is tensioned against that end 203 of the device which is facing away from the tool by tensioning the pulse piston 201 against a space such as a chamber 204, which space, for example, can be filled with a pressurized fluid, whereupon a drive surface 205 acting in the direction of the chamber 204 is pressurized such that a compression of the content of the chamber 204 is obtained, the pressure acting against the drive surface 205 then being abruptly lowered, causing the pulse piston 201 to perform a small movement towards the drill string 202 so as thus to release stored elastic energy upon the increase in tension in the chamber 204.

The storage of elastic energy can be achieved in a number of different ways. For example, apart from compression of the content of a chamber as above, the storage of elastic energy can be achieved by the pulse piston being compressed by pressurization of the drive surface 205 and thus storing energy which, when the pressure is relieved, is then released as a result of the striving of the pulse piston to regain its original shape.

In one exemplary embodiment, the chamber 204 is instead constituted by some type of resilient material, which is compressed upon pressurization of the drive surface 205, so as then, when the pressure upon the drive surface 205 is relieved, to strive to regain its original shape and thus release stored energy, in the form of a pulse, to the tool via the pulse piston. In another exemplary embodiment, a combination of two or more of the above methods can be used.

As stated above, the energy quantity which is released with each shock wave is substantially smaller in a device of the type shown in FIGS. 2A-B compared with a device comprising a conventional percussion piston, in which the transferred energy quantity is mainly constituted by kinetic energy, for which reason the pulse piston 201 has to work at a comparatively substantially higher frequency compared with a conventional percussion piston to enable the same total energy per unit of time to be transferred to the tool. By way of example, it can be stated that a typical working frequency for a reciprocating percussion piston of conventional type is 50-60 Hz, whilst a pulse piston of the type shown in FIGS. 2A-B should rather operate at a frequency of hundreds of Hz, or even at frequencies of one or more kHz, or higher still.

This substantially higher frequency in turn places demands upon the mechanism which opens/closes ducts for pressurization/depressurization of a pressure chamber 206 used to pressurize/depressurize the drive surface 205 of the pulse piston. One way of achieving this is to use a rotary valve, as in WO2004/073933. As shown in the figures belonging to this patent specification, this valve is driven, however, via a motor, which in turn drives the rotary valve via a geared coupling. In order to be able to achieve the desired pulse piston frequency, the rotary valve must rotate at a high frequency, which entails the motor having to rotate at a yet higher frequency, at least if a motor with smaller diameter than the diameter of the rotary valve shall be able to be used. Since there are design-related limitations affecting the maximum rotation speed which can be achieved for a given load, this means in practice that the drive motor must necessarily have a certain diameter, in the case of higher frequencies probably in the order of magnitude of half the diameter of the valve or even larger, which thus leads to the undesirable effects shown in FIGS. 1A-B.

According to the present invention, a drilling machine can be provided which has a substantially smaller diameter compared with the prior art, but which is still capable of opening and closing ducts for pressurization/depressurization of the chamber 206 at the same, or even higher frequency. According to the invention, this is achieved with the aid of a motor concentric with the pulse piston 201, which motor in FIGS. 2A-B is constituted by an axial piston motor 207. The motor 207 shown in FIGS. 2A-B comprises a bevelled disc 208 and a number of axial pistons 222, which, through pressurization/depressurization via a non-rotary motor valve 210 (shown also in greater detail in FIG. 3B), are pressurized via a duct 211 or depressurized via a duct 212, so as conventionally to produce a rotation of the motor 207.

The bevelled disc 208 for the pistons 222 of the axial piston motor 207 is in the rotational direction locked to the drilling machine housing 213. Likewise, the motor valve is locked in the rotational direction, in this case to a pressure transfer part 214 which in the rotational direction is locked against the machine housing 213, but which is axially movable relative to the same.

Figure 3A:
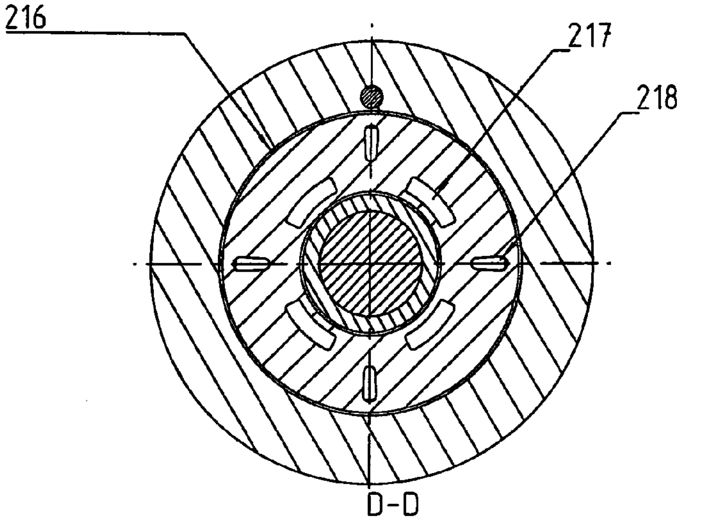
FIGS. 3A-C show a valve disc, a motor valve and a washer for the embodiment shown in FIGS. 2A-B.
Figure 3B:
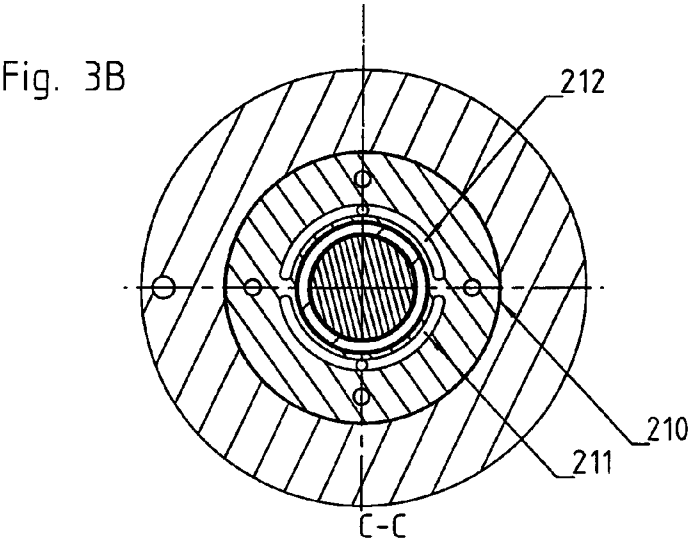
Figure 3C:
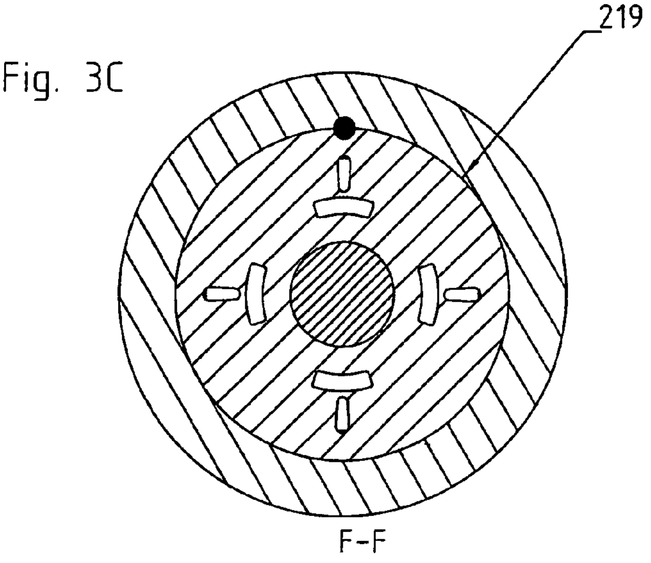

In this example, the pressure transfer part 214 is realized in such a way that it is made with two different diameters (cf. 214A, 214B) with a view to improving the pressure sealing properties of the device between the ducts 220, 221 for pressurization and depressurization of the pulse piston 201. The invention is not, however, limited to pressure transfer parts having a plurality of different diameters, but pressure transfer parts with uniform diameter may also be used where this proves suitable. The motor 207 (the motor drum) is fixedly connected to a hollow shaft 215, which circumferentially surrounds the pulse piston 201. At its end facing away from the motor 207, the hollow shaft 215 is connected, for example by means of a splined coupling or other suitable coupling 223, to a first valve portion in the form of a valve disc 216, an exemplary embodiment of which is shown in FIG. 3A. As is shown in FIG. 3A, the valve disc 216 comprises a set of inner holes 217 and a set of outer holes 218. The outer set of holes 218 is in the circumferential direction angularly offset relative to the inner set of holes 217. The valve disc 216, which rotates during operation, runs counter to a second valve portion fixedly connected to the machine housing, such as, for example, a corresponding valve disc or washer 219, but in which, in the washer 219, the outer set of holes is arranged radially in line with the inner set of holes, that is to say without the said angular offset in the circumferential direction (see FIG. 3*c*).

In this way, the inner and outer set of holes of the valve disc 216 and of the washer 219 will alternately meet up during operation, that is to say a duct to the chamber 206 is opened either via the outer set of holes 218, or alternatively via the inner set of holes 217. One set of holes, in this embodiment the inner set of holes 217, is used to pressurize the chamber 206 via the duct 220, and the outer set of holes is used in this example for drainage-depressurization of the said chamber 206 via the duct 221.

For each revolution made by the motor, the shown device will therefore pressurize and depressurize the chamber 206 four times, so that the pulse frequency of the pulse piston 201 will be four times the rotation frequency of the motor 207. The shown device has the major advantage that the outer diameter of the drilling machine (the percussion device) can be kept substantially smaller compared with the device shown in WO2004/073933, at the same time as a motor up to a relatively large diameter can be used without deviating from the boundaries for the other design-related limitations of the drilling machine, such as pulse piston diameter, etc. Moreover, the whole of the rotation speed of the motor can be utilized, i.e. there is no need for any gear reduction in order to minimize the outer diameter of the drilling machine. This has the advantage that drilling can be carried out at high frequency in, for example, tunnelling, without any significant increase in the generation of surplus rock for removal compared with a conventional percussion piston solution.

The embodiment shown in FIGS. 2A-B also has further advantages. One of these is exemplified in FIG. 2B, in which the return duct 212 of the motor pistons 222 is led to the return duct of the chamber 206, thereby allowing the percussion device to be made with a single common return duct 221. The shown embodiment further has the advantage that no transfer of fluid occurs in the radial direction between rotary and non-rotary parts, since the pressure transfer part 214 is locked in the rotational direction against the machine housing.

The embodiment shown in FIG. 2A-B also has a further important advantage. The fact that the pressure transfer part 214, and thus the motor valve 210, as well as the motor housing 207 and thus the hollow shaft 215 and the valve disc 216, are axially movable relative to the machine housing 213 means that suitable sealing between rotary and non-rotary surfaces, such as between the motor housing 207 and the motor valve 210, or between the valve disc 216 and the pressure transfer part 214 or the washer 219, respectively, can expediently be achieved with the aid of the respective hydraulic pressure for driving of the motor or the drive pressure of the pulse piston (via the duct 220). That is to say, the sealing function is dependent on and can be controlled with the pressure with which the various parts bear one against the other, which is in turn controlled by the pressure levels used for the respective pressure feed.

By adjusting the pressures to a suitable level, which is preferably carried out during the construction stage, it is therefore possible to obtain the desired lubrication at the respective bearing surfaces by controlling the leakage at these surfaces. The embodiment shown in FIGS. 2A-B therefore constitutes a very advantageous drive mechanism, which is especially suitable for use in pulse generating devices in which the drive mechanism has to be arranged between the drive surfaces of the pulse piston and the tool.

Figure 4:
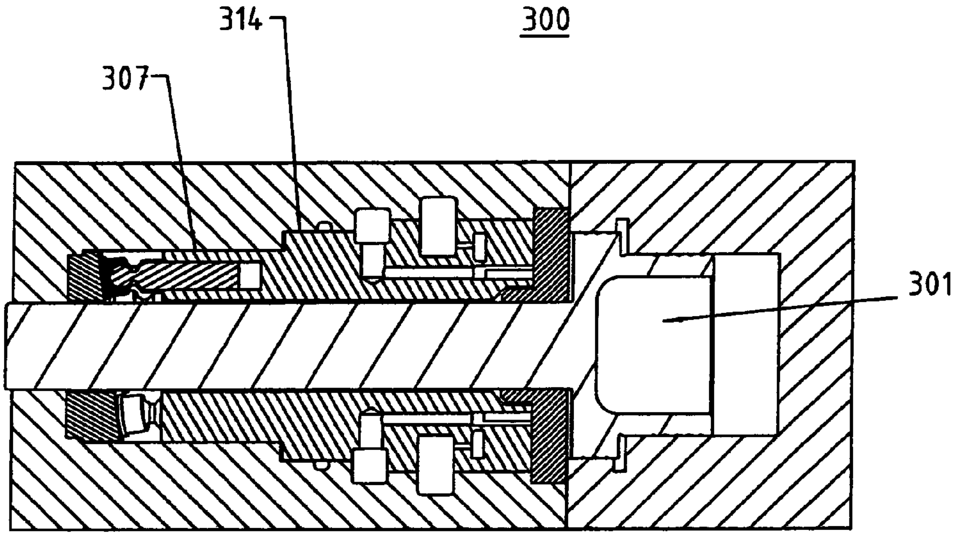
FIG. 4 shows an alternative exemplary embodiment of the present invention.

In FIG. 4, an alternative embodiment of the present invention is shown, which, just like the embodiment shown in FIG. 2, comprises a correspondingly working pulse piston 301, and a drive mechanism for the pulse piston, which in this case, too, is driven by an axial piston motor 307, which is set in rotation with the aid of a bevelled disc 308, as described above.

The device 300 according to this embodiment differs from the embodiment shown in FIG. 2, however, in that in this case the pressure transfer part 314 is also designed to rotate during operation. That is to say, in this example it is not only a hollow shaft which is driven into rotation by the motor 307, but the whole of the pressure transfer part 314. This further implies that, in this embodiment, the valve disc shown in FIGS. 1A-B constitutes an integral part of the pressure transfer part 314. This can be achieved, for example, by the pressure transfer part 314, at its end facing away from the motor 307, being configured with ducts such that, for example, a cross section like the valve disc 216 shown in FIG. 3A is obtained, in which case a corresponding working to that shown in FIGS. 2A-B is obtained when the pressure transfer part in corresponding manner to the first valve portion above (the valve disc 216), through rotation, interacts with a second valve portion locked with the machine housing, such as a valve disc corresponding to the valve disc 219 above.

The embodiment shown in FIG. 4 does not have the advantage obtained with the solution in FIGS. 2A-B that pressure transfer in the radial direction occurs between parts which are locked together in the rotational direction, i.e. in FIGS. 2A-B the pressure transfer part 214 is locked to the machine housing in the rotational direction. In FIG. 4, by contrast, the pressure transfer occurs via radial couplings between the rotary pressure transfer part and the machine housing. In the embodiment shown in FIG. 4, pressure transfer between the respective valve portion continues to be realized axially, however.

The present invention can also be used together with a pulse generating device comprising control means for regulating the course of the pressure drop in the said pressure chamber. By controlling the course of the pressure drop, for example by means of a throttle valve on the return duct 221, the shape of the shock wave can be controlled. Examples of such a control system are shown in patent specification WO2006/126932.

The invention can also be used with solutions in which the interaction of the impact means with the tool is regulated at least partially on the basis of reflected energy at the tool/the rock, which energy is returned through the drill string to the drilling machine. Examples of such solutions are shown in patent specification WO2006/126933.

In the above description, the invention has been described in connection with a specific type of pulse generating devices, i.e. pulse generating devices in which a pressure chamber acting in the direction away from the tool is used to achieve a storage of elastic energy via pressurization, and for release of the same via depressurization. The invention is nevertheless also suitable for use with other types of pulse generating devices for transferring shock waves mainly in the form of elastic energy, such as, for example, pulse generating devices shown in the above-stated patent specifications.

Figure 5:
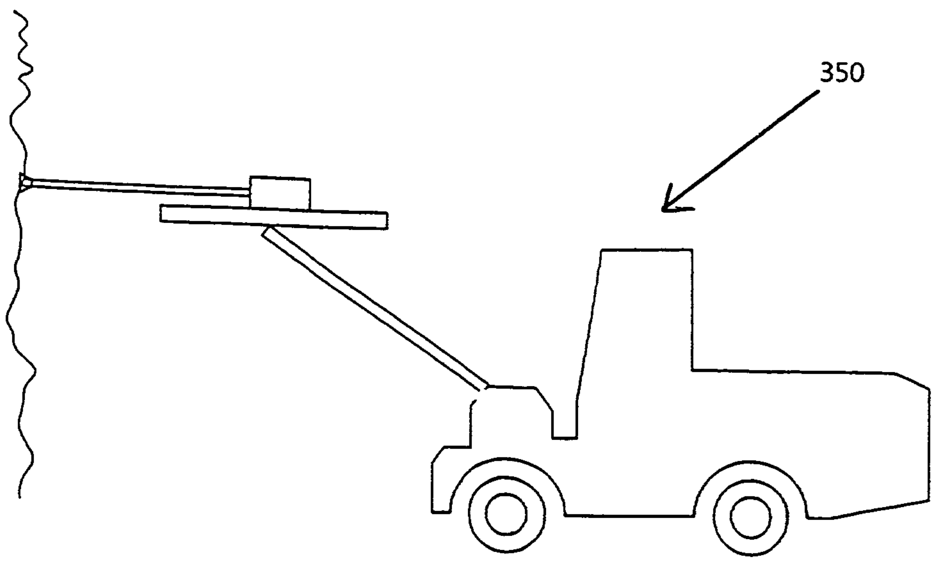
FIG. 5 schematically illustrates a rock drilling rig, including a pulse generating device, in accordance with the present invention.

FIG. 5 schematically illustrates a rock drilling rig, including a pulse generating device in accordance with the present invention. The rock drilling rig is generally illustrated by reference numeral 350.

The invention claimed is:

1. Pulse generating device (200, 300) for inducing a shock wave in a tool, wherein said pulse generating device (200, 300) comprises an impact element (201; 301) for transferring energy to a drill string (202) having a longitudinal axis and connected to said tool, wherein the energy transfer generates said shock wave, said transferred energy consisting of more stored elastic energy than kinetic energy, wherein the device (200; 300) comprises a control element for controlling the interaction of the impact element (201; 301) with the drill string (202), and wherein said control element for controlling the interaction of the impact element (201; 301) with the drill string (202) comprises a motor (207; 307) having a rotation axis and at least two ducts in communication with at least one drive surface for driving said impact element, wherein said motor (207; 307), through rotation, alternately opens said ducts for increasing and decreasing pressure applied to said at least one drive surface (205), wherein the rotation axis of said motor (207; 307) is arranged essentially in coaxial alignment with said longitudinal axis of the drill string (202).

2. Device according to claim 1, characterized in that said motor (207; 307) is designed to be rotated by hydraulically and/or pneumatically working devices.

3. Device according to claim 1, characterized in that said motor (207; 307), in relation to said a at least one drive surface (205), is disposed closer to the tool-facing end of said device (200; 300) than to the end of the device facing away from the tool along the axis of the drill string.

4. Device according to claim 1, wherein, in said energy transfer, the impact element (201; 301) performs a movement in the direction of said tool such that the kinetic energy transferred to the impact element is lower than the elastic energy transferred.

5. Device according to claim 1, characterized in that said motor (207; 307) is designed to rotate a first valve portion (216), wherein rotation of said first valve portion (216) relative to a second valve portion (219) alternately opens said ducts for increasing and decreasing, respectively, pressure applied to said at least one drive surface (205).

6. Device according to claim 5, characterized in that said motor (207; 307) is designed to rotate a hollow shaft (215) circumferentially surrounding at least a part of said drill string (202) and/or drill string component, said hollow shaft (215) being designed to rotate said first valve portion during operation.

7. Device according to claim 5, characterized in that said first valve portion is a valve disc (216).

8. Device according to claim 5, characterized in that rotation of said first valve portion (216) relative to said second valve portion (219) alternately opens said ducts in an essentially axial direction for increasing and decreasing, respectively, pressure applied to said at least one drive surface (205).

9. Device according to claim 1, characterized in that said pulse generating device (200; 300) comprises a pressure chamber (206) acting in the direction away from the tool towards the impact element (201; 301), said motor (207; 307) being designed to, by rotation, alternately open and close said ducts for increasing and decreasing, respectively, the pressure in said pressure chamber (206).

10. Device according to claim 1, characterized in that said motor (207; 307) is an axial piston motor (207; 307).

11. Device according to claim 9, characterized in that said pulse generating device (200; 300) comprises a regulator for regulating the course of the pressure drop in said pressure chamber (206).

12. Device according to claim 5, characterized in that said pulse generating device further comprises a pressure transfer part (214; 314) for transferring pressurized fluid to said first valve portion (216).

13. Device according to claim 12, characterized in that said pressure transfer part (214; 314) is locked in a rotational direction relative to a surrounding housing.

14. Device according to claim 12, characterized in that said pressure transfer part (214; 314) is axially movable relative to a surrounding housing.

15. Device according to claim 1, characterized in that the majority of said stored elastic energy is elastic energy stored in the impact element (201; 301) and/or an energy store (204).

16. Rock drilling rig, characterized in that said rock drilling rig comprises a device (200; 300) according to claim 1.

17. Device according to claim 2, characterized in that said motor (207; 307), in relation to said at least one drive surface (205), is disposed closer to the tool-facing end of said device (200; 300) than to the end of the device facing away from the tool along the axis of the drill string.

18. Device according to claim 2, characterized in that said motor (207; 307) is designed to rotate a first valve portion (216), wherein rotation of said first valve portion (216) relative to a second valve portion (219) alternately opens said ducts for increasing and decreasing, respectively, pressure applied to said at least one drive surface (205).

19. Device according to claim 2, characterized in that the majority of said stored elastic energy is elastic energy stored in the impact element (201; 301) and/or an energy store (204).

20. Rock drilling rig, characterized in that said rock drilling rig comprises a device (200; 300) according to claim 2.

* * * * *